(12) United States Patent
Lee et al.

(10) Patent No.: US 11,310,890 B2
(45) Date of Patent: *Apr. 19, 2022

(54) VEHICLE LAMP CONTROL APPARATUS

(71) Applicant: SILICON WORKS CO., LTD., Daejeon (KR)

(72) Inventors: Ju Hyun Lee, Daejeon (KR); Hai Feng Jin, Daejeon (KR); Sung Gon Kim, Daejeon (KR); Dong Hyeon Kim, Daejeon (KR); Ho Jeong Jin, Daejeon (KR); Chang Sik Shin, Daejeon (KR); Ju Pyo Hong, Daejeon (KR)

(73) Assignee: Silicon Works Co., Ltd., Daejeon (KR)

( * ) Notice: Subject to any disclaimer, the term of this patent is extended or adjusted under 35 U.S.C. 154(b) by 166 days.

This patent is subject to a terminal disclaimer.

(21) Appl. No.: 16/656,371

(22) Filed: Oct. 17, 2019

(65) Prior Publication Data
US 2020/0128644 A1  Apr. 23, 2020

(30) Foreign Application Priority Data
Oct. 18, 2018 (KR) .................. 10-2018-0124713

(51) Int. Cl.
*H05B 47/16* (2020.01)
*H05B 45/00* (2022.01)
*H05B 45/37* (2020.01)
*B60Q 1/34* (2006.01)
*B60R 16/033* (2006.01)

(52) U.S. Cl.
CPC ............. *H05B 47/16* (2020.01); *H05B 45/00* (2020.01); *H05B 45/37* (2020.01); *B60Q 1/34* (2013.01); *B60R 16/033* (2013.01)

(58) Field of Classification Search
CPC ........ H05B 47/16; H05B 45/00; H05B 45/37; H05B 45/32; H05B 45/46; B60R 16/033; B60Q 1/34

See application file for complete search history.

(56) References Cited

U.S. PATENT DOCUMENTS

| 8,398,284 B1 * | 3/2013 | Dvorzsak | F21S 43/14 |
| | | | 362/545 |
| 10,834,799 B2 * | 11/2020 | Jin | H05B 47/16 |
| 2004/0178904 A1 * | 9/2004 | Takeuchi | B60Q 1/38 |
| | | | 340/475 |
| 2013/0200802 A1 * | 8/2013 | Sakuragi | H05B 47/10 |
| | | | 315/122 |

(Continued)

FOREIGN PATENT DOCUMENTS

| KR | 20150068042 A | 6/2015 |
| KR | 20150139741 A | 12/2015 |

(Continued)

*Primary Examiner* — Renan Luque
(74) *Attorney, Agent, or Firm* — Polsinelli PC

(57) ABSTRACT

The present disclosure discloses a vehicle lamp control apparatus. The vehicle lamp control apparatus includes a timing generator configured to detect first and second setting voltages, which are varied, and measure a time in which each of the first and second setting voltages reaches a reference voltage to generate first and second delay times, and a lamp control circuit configured to control sequential turn-on of LED channels using the first and second delay times.

18 Claims, 3 Drawing Sheets

(56) References Cited

U.S. PATENT DOCUMENTS

| | | | |
|---|---|---|---|
| 2015/0241015 A1* | 8/2015 | Johnson | B60Q 1/2603 |
| | | | 362/509 |
| 2018/0103518 A1* | 4/2018 | Janik | H05B 45/24 |
| 2018/0281668 A1 | 10/2018 | Martin | |
| 2020/0049534 A1* | 2/2020 | Kennedy | G01D 7/005 |
| 2021/0172999 A1* | 6/2021 | Nam | G01R 31/3167 |

FOREIGN PATENT DOCUMENTS

| | | |
|---|---|---|
| KR | 20160087088 A | 7/2016 |
| KR | 20190028204 A | 3/2019 |

\* cited by examiner

VEHICLE LAMP CONTROL APPARATUS

CROSS-REFERENCE TO RELATED APPLICATION

This application claims priority to and the benefit of Korean Patent Application No. 2018-0124713, filed on Oct. 18, 2018, the disclosure of which is incorporated herein by reference in its entirety.

BACKGROUND

1. Field of the Invention

The present disclosure relates to a lamp control technique, and more particularly, to a vehicle lamp control apparatus capable of precisely controlling sequential turn-on of vehicle lamps.

2. Description of Related Art

In general, vehicles are provided with lamps for various purposes.

As an example, there are lamps for various purposes which have a lighting function for easily identifying objects located around a vehicle and a signaling function for notifying a driving state of the vehicle.

Among such vehicle lamps, turn signal lamps are installed on left and right sides of front and rear portions of a vehicle and blink according to a driver's operation and are used for a function of notifying surrounding vehicles or pedestrians of the turning direction of the vehicle.

Meanwhile, in the development of high brightness light-emitting diodes (LEDs), LEDs have been adopted as a light source for a vehicle lamp, and as the LEDs are adopted as the light source, the design of vehicle lamps has been diversified, and as the design is diversified, the number of LED channels required for the configuration of the vehicle lamp is also increasing.

Recently, there is a need for a method of more intuitively recognizing a traveling direction of a vehicle, and there is also a need for technology capable of precisely controlling sequential turn-on of LED channels that are used as a vehicle lamp.

SUMMARY

The present disclosure is directed to providing a vehicle lamp control apparatus capable of precisely controlling sequential turn-on of vehicle lamps.

According to an aspect of the present disclosure, there is provided a vehicle lamp control apparatus including a timing generator configured to detect a first setting voltage and a second setting voltage, which are varied, and measure a time in which each of the first setting voltage and the second setting voltage reaches a reference voltage to generate a first delay time and a second delay time, and a lamp control circuit configured to control sequential turn-on of light-emitting diode (LED) channels using the first delay time and the second delay time.

According to another aspect of the present disclosure, there is provided a vehicle lamp control apparatus including a timing generator configured to detect a setting voltage, which is varied, in response to a battery status signal and generate a delay time by measuring a time in which the setting voltage reaches a reference voltage, a lamp control circuit configured to sequentially turn on light-emitting diode (LED) channels at an interval of the delay time.

According to still another aspect of the present disclosure, there is provided a vehicle lamp control apparatus including a timing generator configured to detect setting voltages, which are varied, in response to a battery status signal and generate delay times by measuring a time in which each of the setting voltages reaches a reference voltage, a timing controller configured to generate a start signal using the battery status signal and at least one of the delay times and generate channel control signals using the start signal and the remaining delay times, and a constant current controller configured to turn on at least one of light-emitting diode (LED) channels in response to the start signal and to control sequential turn-on of the remaining LED channels in response to each of the channel control signals.

As described above, a vehicle lamp control apparatus according to the present embodiments can simply set delay times, which are required for sequentially turning on LED channels, for each of the LED channels using at least one external module and a reference voltage.

Further, the vehicle lamp control apparatus according to the present embodiments can simply set target delay times for each of the LED channels by adjusting at least one of a value of an external module, a level of the reference voltage, and the intensity of a current. Thus, the present embodiments can precisely control sequential turn-on of the LED channels.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION OF THE EMBODIMENTS

Hereinafter, exemplary embodiments of the present disclosure will be described in detail with reference to the accompanying drawings. The terms or words used in the present specification and claims should not be construed as being limited to ordinary or dictionary meanings and should be construed as meanings and concepts consistent with the spirit of the present disclosure.

Since embodiments described in the present specification and configurations illustrated in drawings are exemplary embodiments of the present disclosure and do not represent the overall technological scope of the present disclosure, the present disclosure covers various equivalents, modifications, and substitutions at the time of filing of this application.

Embodiments of the present disclosure provide a vehicle lamp control apparatus capable of simply setting at least one delay time that may be used to precisely control sequential turn-on of vehicle lamps using at least one external module and one reference voltage.

Figure 1:
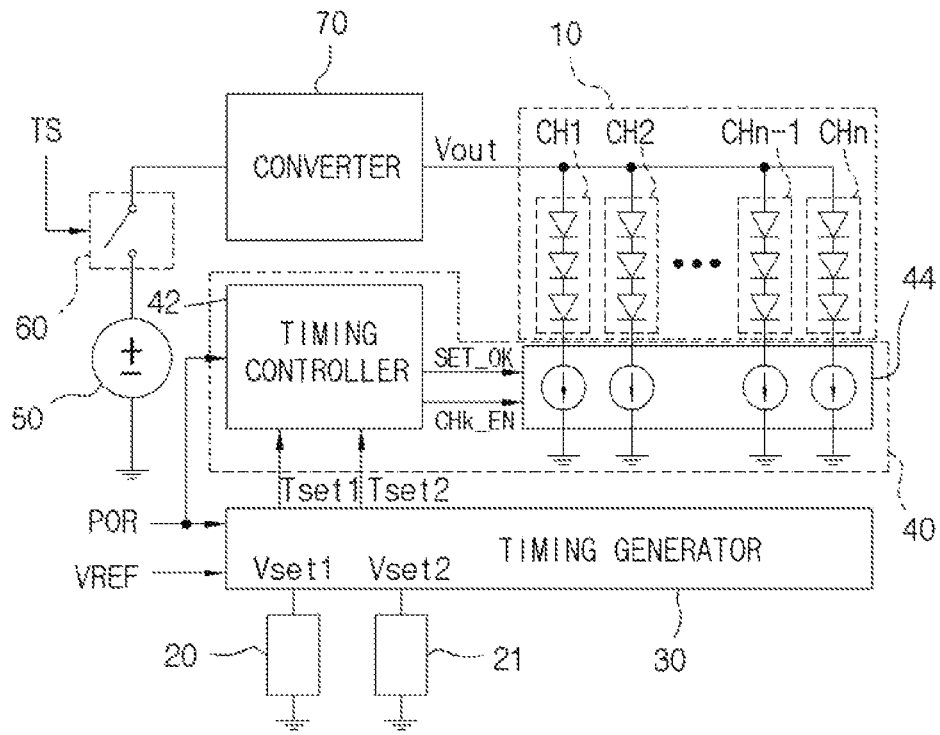
FIG. 1 is a block diagram of a vehicle lamp control apparatus according to one embodiment of the present disclosure.
Figure 2:
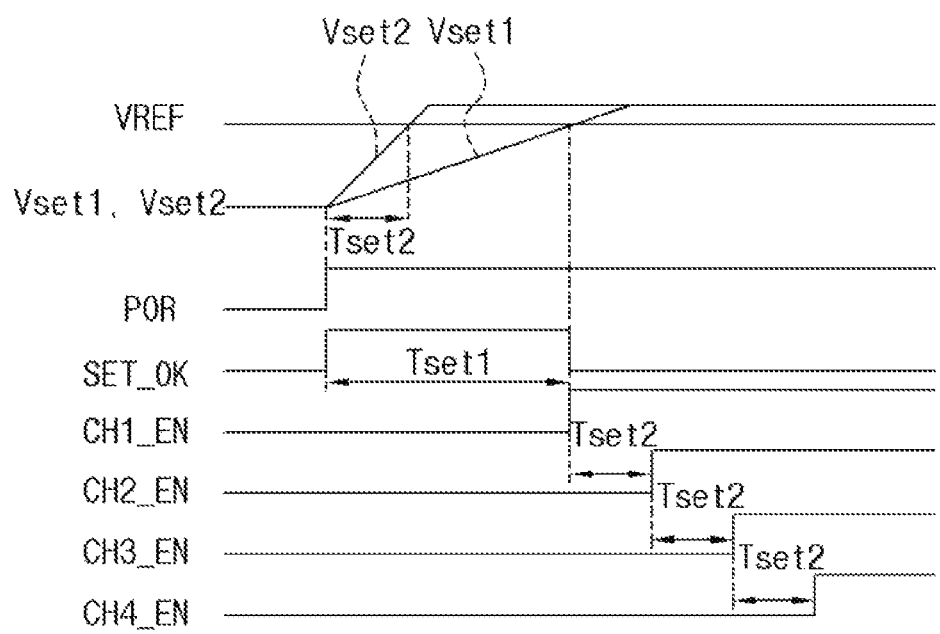
FIG. 2 is a timing diagram for describing an operation of the vehicle lamp control apparatus according to one embodiment of FIG. 1.

FIG. 1 is a block diagram of a vehicle lamp control apparatus according to one embodiment of the present disclosure, and FIG. 2 is a timing diagram for describing an operation of the vehicle lamp control apparatus according to one embodiment of FIG. 1.

Referring to FIGS. 1 and 2, the vehicle lamp control apparatus according to one embodiment may include a lamp 10, first and second external modules 20 and 21, a timing generator 30, a lamp control circuit 40, a switch circuit 60, and a converter 70.

The lamp 10 includes light-emitting diode (LED) channels CH1 to CHn. As an example, the lamp 10 may be used as a turn signal lamp of a vehicle, and each of the LED channels CH1 to CHn may be configured by connecting a plurality of LEDs in series or in series-parallel.

The first and second external modules 20 and 21 may be used to set first and second delay times Tset1 and Tset2 required for sequentially turning on the LED channels CH1 to CHn. As an example, each of the first and second external modules 20 and 21 may include at least one of a capacitor and a resistor or may include another external element.

The first and second external modules 20 and 21 have first and second setting voltages Vset1 and Vset2, respectively, and the first and second setting voltages Vset1 and Vset2 may be used to set the first and second delay times Tset1 and Tset2, respectively.

The first and second setting voltages Vset1 and Vset2 may be varied with different slopes, and the slope of each of the first and second setting voltages Vset1 and Vset2 may be set with at least one of a value of the capacitor, a value of the resistor, an intensity of a current applied to each of the first and second external modules 20 and 21, and a level of a reference voltage VREF.

That is, in the embodiment, the first and second delay times Tset1 and Tset2 required for sequentially turning on the LED channels CH1 to CHn may be adjusted using at least one of the value of the capacitor, the value of resistor, the intensity of the current, and the level of the reference voltage.

Meanwhile, the embodiment of FIGS. 1 and 2 is implemented to adjust the slopes of the first and second setting voltages Vset1 and Vset2 through the first and second external modules 20 and 21, but the present disclosure is not limited thereto.

A vehicle lamp control apparatus according to another embodiment may be configured to adjust the slopes of the first and second setting voltages Vset1 and Vset2 by receiving at least one of a pulse width modulation (PWM) signal and an analog signal from a microcontroller unit (MCU) (not shown) of the vehicle which is interlocked with a turn signal TS. Here, the first and second delay times Tset1 and Tset2 may be adjusted according to at least one of the PWM signal, the analog signal, and the level of the reference voltage.

The timing generator 30 may detect the first and second setting voltages Vset1 and Vset2, which vary according to the currents of the first and second external modules 20 and 21, when a battery status signal POR is activated. Here, the currents of the external modules 20 and 21 may be applied from the timing generator 30 when the battery status signal POR is activated or generated by the external modules 20 and 21. Here, the battery status signal POR may be activated when battery power supplied in conjunction with the turn signal TS of the vehicle is stabilized. The first and second setting voltages Vset1 and Vset2 may vary according to the currents of the first and second external modules 20 and 21, respectively, or may vary according to at least one of the analog signal and the PWM signal provided from the external MCU.

In addition, the timing generator 30 generates the first and second delay times Tset1 and Tset2 by measuring a time in which each of the first and second setting voltages Vset1 and Vset2 reaches the reference voltage VREF and provides the first and second delay times Tset1 and Tset2 to the lamp control circuit 40.

As an example, the timing generator 30 may detect the first and second setting voltages Vset1 and Vset2, which rise with first and second slopes when the battery status signal POR is activated, and measure the time in which each of the first and second setting voltages Vset1 and Vset2 reaches the reference voltage VREF to generate the first and second delay times Tset1 and Tset2.

Figure 3:
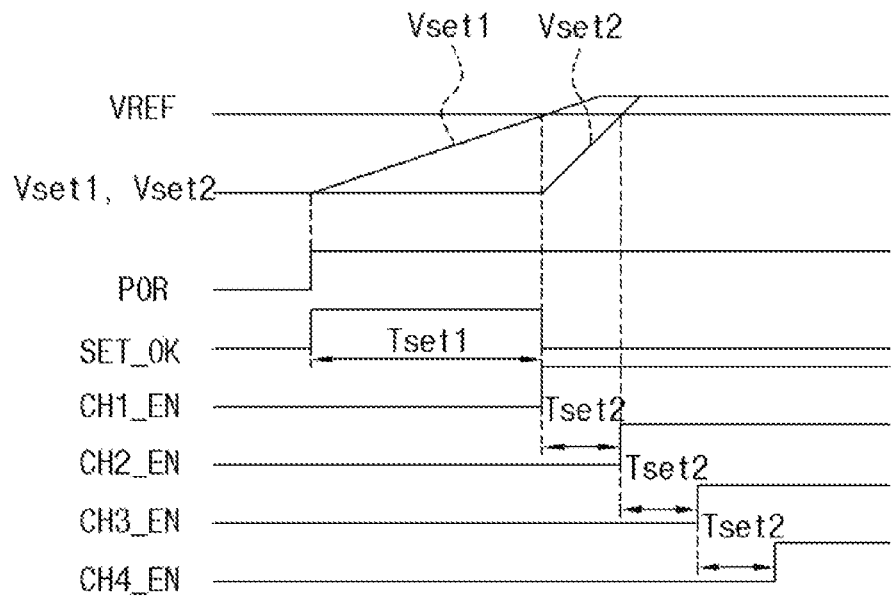
FIG. 3 is a timing diagram for describing an operation of the vehicle lamp control apparatus according to another embodiment of FIG. 1.

As an example, as shown in FIG. 2, the first and second delay times Tset1 and Tset2 may be measured using the first and second setting voltages Vset1 and Vset2 that are simultaneously varied with the first and second slopes, respectively. As another example, as shown in FIG. 3, the first delay time Tset1 may be generated by measuring a time in which the first setting voltage Vset1 reaches the reference voltage VREF with the first slope, and after the first setting voltage Vset1 reaches the reference voltage VREF, the second delay time Tset2 may be generated by measuring a time in which the second setting voltage Vset2 reaches the reference voltage VREF.

The lamp control circuit 40 controls the sequential turn-on of the LED channels using the first and second delay times Tset1 and Tset2. Specifically, the lamp control circuit 40 turns on at least one of the LED channels using the first delay time Tset1 and sequentially turns on the remaining LED channels using the second delay time Tset2.

As an example, the lamp control circuit 40 may turn on at least one of the LED channels when the first delay time Tset1 has passed from a time point at which the battery status signal POR is activated and then sequentially turn on the remaining LED channels at an interval of the second delay time Tset2.

As another example, the lamp control circuit 40 may be configured to turn on a first LED channel or turn on first and second LED channels simultaneously when the first delay time Tset1 has passed and sequentially turn on the remaining LED channels at the interval of the second delay time Tset2.

Further, the lamp control circuit 40 may receive a vehicle status signal (not shown) and simultaneously turn on some or all LED channels according to the vehicle status signal. As an example, the vehicle status signal may have a logic level set according to whether the turn signal TS and an emergency signal (not shown) are activated, and the lamp control circuit 40 may sequentially turn on the LED channels or simultaneously turn on all the LED channels according to the logic level of the vehicle status signal.

The lamp control circuit 40 may include a timing controller 42 and a constant current controller 44. The timing controller 42 generates a start signal SET_OK using the battery status signal POR and the first delay time Tset1 and generates a channel control signal CHk_EN using the start signal SET_OK and the second delay time Tset2.

As an example, the start signal SET_OK has a pulse width from the time point at which the battery status signal POR is activated to a time point at which the first delay time Tset1 has passed, and the channel control signal CHk_EN may be synchronized to the start signal SET_OK to be enabled at the interval of the second delay time Tset2. Here, the start signal SET_OK may be used to set delays between integrated circuits (ICs), and the channel control signal CHk_EN may be used to set delays between the LED channels.

The constant current controller 44 turns on at least one of the LED channels CH1 to CHn in response to the start signal SET_OK and sequentially turns on the remaining LED channels in response to the channel control signal CHk_EN. The constant current controller 44 may include switches each configured to control each of the LED channels CH1 to CHn with a constant current in response to the channel control signal CHk_EN.

The constant current controller 44 illustrated in FIG. 1 is configured to be located on cathode sides of the LED channels but is not limited thereto and may be configured to be located on anode sides of the LED channels.

The vehicle lamp control apparatus may be formed of one IC or a plurality of ICs. Meanwhile, when the vehicle lamp control apparatus includes the plurality of ICs, the start signal SET_OK, which is set to at least one of the ICs, may be set to a time at which all LED channels driven in the previous IC are turned on. That is, the start signal SET_OK may be used to set the delay times between ICs.

The switch circuit 60 supplies a power of a battery 50 to the converter 70. Here, the switch circuit 60 may be activated in response to the turn signal TS interlocked with a turn signal switch (not shown) of the vehicle.

The converter 70 regulates the power supplied from the battery 50 and applies a regulated predetermined voltage Vout to the LED channels CH1 to CHn of the lamp 10. The embodiment described with reference to FIG. 1 is configured to apply the predetermined voltage Vout to the lamp 10 by regulating the battery power, but is not limited thereto, and may be configured such that the converter 70 is omitted and the battery power is directly applied to the lamp 10 through the switch circuit 60 depending on the application.

Meanwhile, each of the first and second external modules 20 and 21 may include at least one of a capacitor and a resistor that are capable of adjusting the slope of each of the first and second setting voltages Vset1 and Vset2 that vary according to the applied currents or another external element. As another example, when the battery status signal POR is activated, currents may be generated by the first and second external modules 20 and 21, intensities of the currents may be varied according to values of the first and second external modules 20 and 21, and the slopes of the first and second setting voltages Vset1 and Vset2 may be adjusted using the currents.

Here, the first and second delay times Tset1 and Tset2 may be determined according to at least one of the values of the capacitor and the resistor or may be determined according to the level of the reference voltage and the intensities of the currents of the first and second external modules 20 and 21. That is, in the present embodiment, the first and second delay times Tset1 and Tset2 may be set by adjusting the slopes of the first and second setting voltages Vset1 and Vset2 that are varied by adjusting at least one of the value of the capacitor, the value of the resistor, the level of the reference voltage, and the intensity of the current.

As another embodiment, the first and second delay times T1 and T2 may be generated with one resistor by varying the level of the reference voltage VREF or varying a slope of the current through internal setting. Further, as another embodiment, the slopes of the first and second setting voltages Vset1 and Vset2 may be adjusted by receiving at least one of the PWM signal and the analog signal from the external MCU, and in this case, the first and second delay times Tset1 and Tset2 may be set according to at least one of values of the PWM signal and the analog signal and the level of the reference voltage.

FIG. 3 is a timing diagram for describing an operation of the vehicle lamp control apparatus according to another embodiment of FIG. 1.

Referring to FIG. 3, in the embodiment, a first delay time Tset1 may be generated by detecting a first setting voltage Vset1 that rises with a first slope when a battery status signal POR is activated and measuring a time in which the first setting voltage Vset1 reaches a reference voltage VREF. In addition, in the embodiment, a second delay time Tset2 may be generated by detecting a second setting voltage Vset2 that rises with a second slope when the first setting voltage Vset1 reaches the reference voltage VREF and measuring a time in which the second setting voltage Vset2 reaches the reference voltage VREF.

As shown in FIG. 3, in the embodiment, the first delay time Tset1 may be measured using the first setting voltage Vset1 that varies first, and the second delay time Tset2 may be measured using the second setting voltage Vset2 that varies after the first setting voltage Vset1 has varied.

Figure 4:
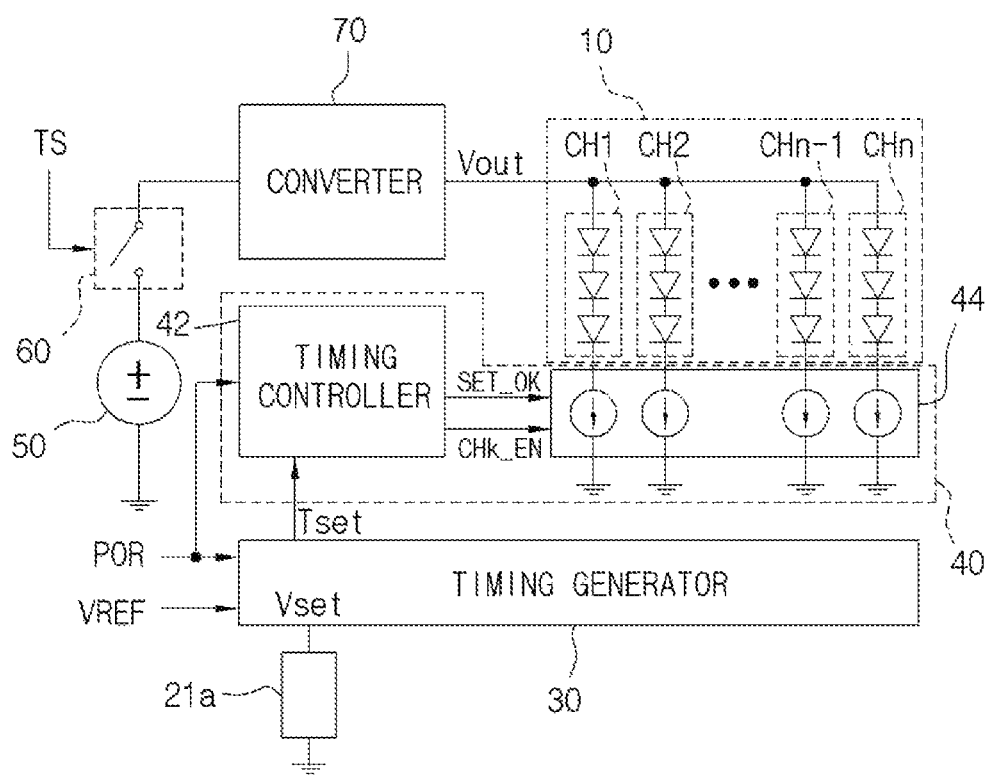
FIG. 4 is a block diagram of a vehicle lamp control apparatus according to another embodiment of the present disclosure.
Figure 5:
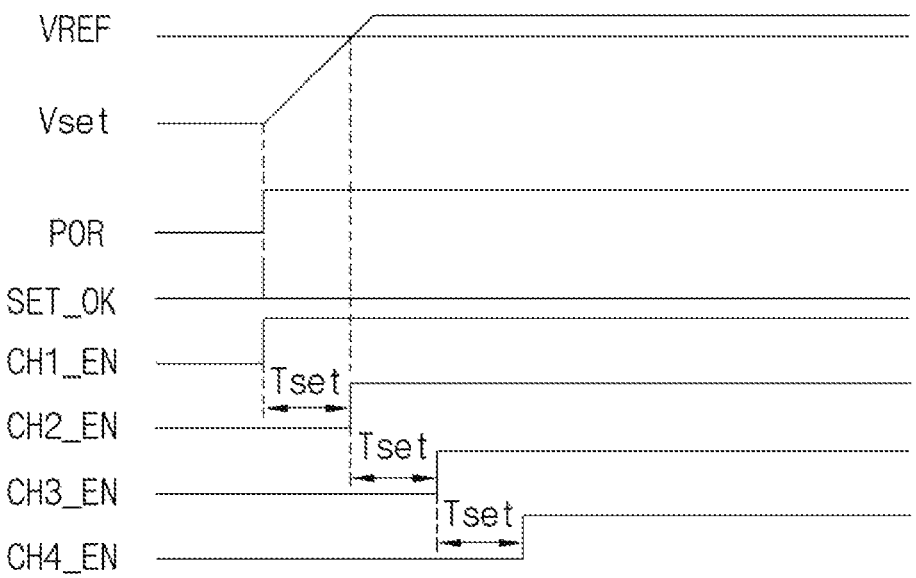
FIG. 5 is a timing diagram for describing an operation of FIG. 4.

FIG. 4 is a block diagram of a vehicle lamp control apparatus according to another embodiment of the present disclosure, and FIG. 5 is a timing diagram for describing an operation of FIG. 4.

Referring to FIGS. 4 and 5, the vehicle lamp control apparatus according to another embodiment may include a lamp 10, an external module 21a, a timing generator 30, a lamp control circuit 40, a switch circuit 60, and a converter 70. Hereinafter, descriptions for the components that are substantially the same as or similar to those of the embodiment described with reference to FIGS. 1 and 2 will be replaced with the descriptions of the embodiment of FIGS. 1 and 2.

The external module 21a may be used to set a time required for sequentially turning on LED channels CH1 to CHn of the lamp 10. As an example, the external module 21a may include at least one of a capacitor and a resistor that are capable of adjusting a slope of a setting voltage Vset that varies according to an applied current or another external element. As another example, when a battery status signal POR is activated, a current may be generated by the external module 21a, the intensity of the current may be varied according to a value of the external module 21a, and a slope of the setting voltage Vset may be adjusted using the current.

The timing generator 30 detects the setting voltage Vset that varies according to the current applied to the external module 21a in response to the battery status signal POR and measures a time in which the setting voltage Vset reaches the reference voltage VREF to generate a delay time Tset. Here, the battery status signal POR may be activated when battery power supplied in conjunction with a turn signal TS is stabilized.

Here, the delay time Tset may be determined according to at least one of a value of the capacitor and a value of the resistor or may be determined according to a level of the reference voltage and the intensity of the current of the external module 21a. That is, in the present embodiment, the delay time Tset may be set by adjusting the slope of the setting voltage Vset that varies according to at least one of the value of the capacitor, the value of the resistor, the level of the reference voltage, and the intensity of the current. Here, in the present embodiment, the delay time Tset may be generated with one resistor by varying the level of the reference voltage VREF or varying a slope of the current through internal setting.

The lamp control circuit 40 controls the sequential turn-on of the LED channels using the delay time Tset. As an example, the lamp control circuit 40 may turn on one of the LED channels in response to the activation of the battery status signal POR and then sequentially turn on the remaining LED channels at an interval of the delay time Tset.

The lamp control circuit 40 may include a timing controller 42 and a constant current controller 44. The timing controller 42 generates a start signal SET_OK in response to the activation of the battery status signal POR and generates a channel control signal CHk_EN using the start signal SET_OK and the delay time Tset. The constant current controller 44 turns on one of the LED channels CH1 to CHn in response to the start signal SET_OK and sequentially turns on the remaining LED channels in response to the channel control signal CHk_EN.

Figure 6:
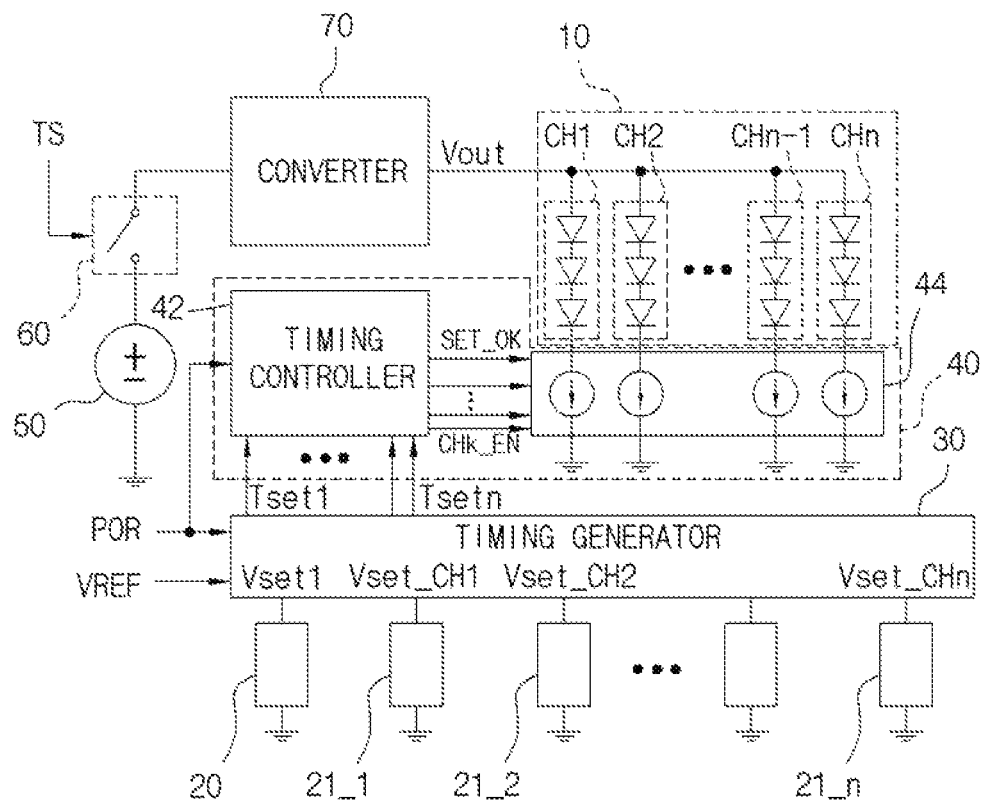
FIG. 6 is a block diagram of a vehicle lamp control apparatus according to still another embodiment of the present disclosure.

FIG. 6 is a block diagram of a vehicle lamp control apparatus according to still another embodiment of the present disclosure. The embodiment of FIG. 6 illustrates that first to n-th delay times Tset1 to Tsetn are individually generated to turn on each of LED channels CH1 to CHn, and each of the LED channels CH1 to CHn is turned on sequentially using the generated first to n-th delay times Tset1 to Tsetn.

Referring to FIG. 6, the vehicle lamp control apparatus according to still another embodiment may include a lamp 10, external modules 20 and 21_1 to 21_n, a timing generator 30, a lamp control circuit 40, a switch circuit 60, and a converter 70.

The lamp 10 includes the LED channels CH1 to CHn. As an example, each of the LED channels CH1 to CHn may be formed of a plurality of LEDs connected in series or in series-parallel.

The external modules 20 and 21_1 to 21_n may be used to set the delay times Tset1 to Tsetn required for sequentially turning on the LED channels CH1 to CHn. At least one external module 20 of the external modules 20 and 21_1 to 21_n may be used to set the first delay time Tset1 for turning on at least one LED channel CH1 of the LED channels CH1 to CHn after a power state of a battery is stabilized, and the remaining external modules 21_1 to 21_n may be used to set the second to n-th delay times Tset2 to Tsetn for sequentially turning on the remaining LED channels.

The timing generator 30 applies a preset current to the external modules 20 and 21_1 to 21_n when a battery status signal POR is activated and detects voltages Vset1 and Vset_CH1 to Vset_CHn that vary according to the current. Here, the battery status signal POR may be activated when battery power supplied in conjunction with a turn signal of a vehicle is stabilized.

In addition, the timing generator 30 may generate the delay times Tset1 to Tsetn by measuring a time in which each of the voltages Vset1 and Vset_CH1 to Vset_CHn reaches a reference voltage VREF.

The lamp control circuit 40 turns on at least one of the LED channels using at least one delay time of the first to n-th delay times Tset1 to Tsetn and sequentially turns on the remaining LED channels using the remaining delay times.

As an example, the lamp control circuit 40 may sequentially turn on all of the LED channels CH1 to CHn through the method of turning on at least one LED channel CH1 among the LED channels CH1 to CHn when the first delay time Tset1 has passed from a time point at which the battery status signal POR is activated, turning on a next LED channel that is an LED channel CH2 when the second delay time Tset2 has passed from a time point at which the LED channel CH1 is turned on, and turning on a next LED channel that is an LED channel CH3 when the third delay time Tset3 has passed from a time point at which the LED channel CH2 is turned on.

Here, the first to n-th delay times Tset1 to Tsetn may be set to be the same or different for each LED channel using the external modules 20 and 21_1 to 21_n. Here, each of the first to n-th delay times Tset1 to Tsetn may be determined according to at least one of values of a capacitor and a resistor constituting each of the external modules or determined by adjusting intensities of the currents applied to the external modules. That is, in the present embodiment, turning on times for LED channels may be individually set by adjusting a value of each of the external modules and the intensity of the current applied to each of the external modules.

The lamp control circuit 40 may include a timing controller 42 and a constant current controller 44. The timing controller 42 generates a start signal SET_OK using the battery status signal POR and the first delay time Tset1 and generates channel control signals CHk_EN using the start signal SET_OK and the second to n-th delay times Tset2 to Tsetn. The constant current controller 44 turns on at least one LED channel CH1 of the LED channels CH1 to CHn in response to the start signal SET_OK and sequentially turns on the remaining LED channels CH2 to CHn in response to each of the channel control signals CHk_EN.

Meanwhile, the vehicle lamp control apparatus may be formed of a plurality of ICs, and here, the start signal SET_OK, which is set in at least one of the ICs, may be set to a time at which all LED channels driven in the previous ICs are turned on. That is, the start signal SET_OK may be used to set the delay times between ICs.

As described above, the vehicle lamp control apparatus according to the present embodiments may simply set the delay times, which are required for sequentially turning on the LED channels, for each of LED channels using at least one external module and the reference voltage VREF.

Further, the vehicle lamp control apparatus according to the present embodiments may simply set the target delay times for each of the LED channels by adjusting at least one of the value of the external module, the intensity of the current, and the level of the reference voltage. Thus, the present embodiments may precisely control sequential turn-on of the LED channels.

What is claimed is:

1. A vehicle lamp control apparatus comprising:
   a timing generator configured to detect a first setting voltage and a second setting voltage, which are varied, and measure a time in which each of the first setting voltage and the second setting voltage reaches a reference voltage to generate a first delay time and a second delay time; and
   a lamp control circuit configured to control sequential turn-on of light-emitting diode (LED) channels using the first delay time and the second delay time, and
   wherein the first setting voltage and the second setting voltages are varied with different slopes from each other.

2. The vehicle lamp control apparatus of claim 1, further comprising a first external module and a second external module that are connected to the timing generator, wherein the timing generator detects the first setting voltage and the second setting voltage that vary according to currents of the first external module and the second external module.

3. The vehicle lamp control apparatus of claim 2, wherein each of the first external module and the second external module includes at least one of a capacitor and a resistor.

4. The vehicle lamp control apparatus of claim 3, wherein the timing generator adjusts the first delay time and the second delay time according to at least one of a value of the capacitor, a value of the resistor, a level of the reference voltage, and an intensity of the current.

5. the vehicle lamp control apparatus of claim 1, wherein the timing generator detects the first setting voltage and the second setting voltage that are varied according to at least one of values of a pulse width modulation (PWM) signal and an analog signal that are provided from the outside.

6. The vehicle lamp control apparatus of claim 5, wherein the timing generator adjusts the first delay time and the second delay time according to at least one of the PWM signal, the analog signal, and the level of the reference voltage.

7. The vehicle lamp control apparatus of claim 1, wherein the timing generator receives a battery status signal, which is activated when battery power supplied in conjunction with a turn signal is stabilized, and provides the first delay time and the second delay time to the lamp control circuit in response to the battery status signal.

8. The vehicle lamp control apparatus of claim 1, further comprising:
a switch circuit configured to supply battery power in response to a turn signal; and
a converter configured to regulate the battery power supplied from the switch circuit and provide a predetermined voltage, which is obtained by regulating the battery power, to the LED channels.

9. The vehicle lamp control apparatus of claim 1, wherein the lamp control circuit includes:
a timing controller configured to generate a start signal using a battery status signal and the first delay time and generate a channel control signal using the start signal and the second delay time; and
a constant current controller configured to turn on at least one of the LED channels in response to the start signal and sequentially turn on the remaining LED channels in response to the channel control signal.

10. A vehicle lamp control apparatus comprising:
a timing generator configured to detect a setting voltage, which is varied, in response to a battery status signal and generate a delay time by measuring a time in which the setting voltage reaches a reference voltage;
a lamp control circuit configured to sequentially turn on light-emitting diode (LED) channels at an interval of the delay time;
an external module connected to the timing generator, and wherein the timing generator receives the battery status signal, which is activated when battery power supplied in conjunction with a turn signal is stabilized, and provides the delay time to the lamp control circuit in response to the battery status signal, and wherein the external module includes at least one of a capacitor and a resistor.

11. The vehicle lamp control apparatus of claim 10, wherein the timing generator detects the setting voltage varied according to a current of the external module.

12. The vehicle lamp control apparatus of claim 11, wherein the timing generator adjusts the delay time according to at least one of a value of the capacitor, a value of the resistor, a level of the reference voltage, and an intensity of the current.

13. The vehicle lamp control apparatus of claim 10, wherein the timing generator detects the setting voltage varied according to at least one of values of a pulse width modulation (PWM) signal and an analog signal that are provided from the outside.

14. The vehicle lamp control apparatus of claim 13, wherein the timing generator adjusts the delay time according to at least one of the PWM signal, the analog signal, and the level of the reference voltage.

15. A vehicle lamp control apparatus comprising:
a timing generator configured to detect setting voltages, which are varied, in response to a battery status signal and generate delay times by measuring a time in which each of the setting voltages reaches a reference voltage;
a timing controller configured to generate a start signal using the battery status signal and at least one of the delay times and generate channel control signals using the start signal and the delay times not used to generate the start signal; and
a constant current controller configured to turn on at least one of light-emitting diode (LED) channels in response to the start signal and to control sequential turn-on of the remaining LED channels in response to each of the channel control signals.

16. The vehicle lamp control apparatus of claim 15, wherein the timing generator receives the battery status signal, which is activated when battery power supplied in conjunction with a turn signal is stabilized, and provides the delay times to the timing controller in response to the battery status signal.

17. The vehicle lamp control apparatus of claim 15, further comprising external modules connected to the timing generator,
wherein the timing generator detects the setting voltages varied according to currents of the external modules,
each of the external modules includes at least one of a capacitor and a resistor, and
the timing generator adjusts each of the delay times according to at least one of a value of the capacitor, a value of the resistor, a level of the reference voltage, and an intensity of the current of each of the external modules.

18. The vehicle lamp control apparatus of claim 15, wherein when a lamp control circuit includes a plurality of integrated circuits (ICs), at least one of the ICs sets the start signal to a time at which all the LED channels driven in the previous ICs are turned on.

* * * * *